United States Patent [19]

Niimi et al.

[11] 4,389,892
[45] Jun. 28, 1983

[54] REVERBERATION CHARACTERISTICS MEASURING DEVICE

[75] Inventors: Koji Niimi; Fukushi Kawakami, both of Hamamatsu, Japan

[73] Assignee: Nippon Gakki Seizo Kabushiki Kaisha, Hamamatsu, Japan

[21] Appl. No.: 255,806

[22] Filed: Apr. 20, 1981

[30] Foreign Application Priority Data

Apr. 30, 1980 [JP] Japan .................................. 55-56169
Apr. 30, 1980 [JP] Japan .................................. 55-56170

[51] Int. Cl.³ ............................................. G01H 7/00
[52] U.S. Cl. ..................................................... 73/586
[58] Field of Search .................... 73/571, 586, 645-648

[56] References Cited

U.S. PATENT DOCUMENTS 3,270,833 9/1966 Schroeder ............................ 73/586
3,352,378 11/1967 Schroeder ............................ 73/586
3,827,288 8/1974 Fletcher ............................ 73/586 X

FOREIGN PATENT DOCUMENTS 2253207 6/1975 France .................................. 73/586

OTHER PUBLICATIONS

Pallett et al.—Noise Control Engineering, vol. 7, No. 2, pp. 71-80, Sep.-Oct. 1976.

Primary Examiner—Charles A. Ruehl
Attorney, Agent, or Firm—Spensley, Horn, Jubas & Lubitz

[57] ABSTRACT

A device for measuring reverberation characteristics in a reverberation room by a digital squaring and integrating computation process. According to the invention, only a part of digital data of a large word length obtained by squaring and integrating a reverberation signal is selected out for computing the reverberation characteristics in accordance with a measuring environment such as integration time and duration of a test pulse. By this arrangement, circuitry for computing the reverberation characteristics can be made compact and time required for computing can be shortened without sacrificing the accuracy of measurement. Further, according to the invention, the level of an input signal can be computed and displayed by computing intermediate squared and integrated data at a certain time interval and adding this data with compensation data corresponding to a frequency band width of the input signal. The compensation data is automatically calculated in accordance with a set frequency of the test pulse so that a concise input signal level computation and display circuit can be provided.

4 Claims, 9 Drawing Figures

REVERBERATION CHARACTERISTICS MEASURING DEVICE

BACKGROUND OF THE INVENTION

This invention relates to a device for measuring reverberation characteristics in a transmission system by a digital squaring and integrating computation process.

Known in the art of an acoustic measurement in a chamber, particularly measurement of transient characteristics such as reverberation time, is the impulse response squaring and integrating process devised by M. R. Schroeder. The basic principle of this process is to measure, when the source band noise is stopped from a steady state, transient characteristics of a received signal S(t) at a sound receiving point. That is, inherent transient response is expressed by an ensemble average of the squared noise decay $<S^2(t)>$, which is expressed on the basis of impulse response r(x) between the sound source and the sound receiving point, by the following equation $$<S^2(t)> = N \int_t^\infty r^2(x)dx$$

where N is power of the source band noise.

Accordingly, by squaring and integrating the impulse response r(x) in the integration interval [t, +∞], the ensemble average of the squared noise decay $<S^2(t)>$ at the time point t can be obtained.

FIG. 1 schematically shows the prior art reverberation measuring device implementing the above described process. In a measurement room 1 where reverberation characteristics are to be measured, there are provided an impulse source (e.g. a speaker) 2 which generates a test pulse and a microphone 3 which collects the generated test pulse signal. The signal h(x) collected by the microphone 3 is amplified by an amplifier 8 and is converted to digital data by an analog-to-digital converter 4 and thereafter is squared and integrated by a squaring and integrating circuit 5. The output data of the circuit 5 is applied to a reverberation characteristics computing circuit 6 in which the data is sampled and sequentially loaded in a random-access memory 6a. A calculator 6b calculates reverberation characteristics such as reverberation time on the basis of the data loaded in the memory 6a. The result of the calculation is displayed in a display unit 7a.

If the analog-to-digital converter 4 has a word length of e.g. 12 bits and the sampling frequency is set of 50 kHz in the prior art reverberation measuring device, in order to measure reverberation time up to 60 second the squaring and integrating circuit 5 must have a word length of 40 bits or more. In the prior art device, the word length required for computation of reverberation characteristics is the same as that used by the squaring and integrating circuit 5. For this reason, a large scale computing circuit 6 is necessitated and, moreover, a long calculation time is required.

As regards displaying of the level of the input signal in the prior art device, the level of the input signal h(x) through the amplifier 8 and a signal level detection circuit 9a is displayed by a display unit 7b. Alternatively, the output of the analog-to-digital converter 4 is applied to a signal level detection circuit 9b and the detected level is displayed by a display unit 7c.

In either case, the circuit portion for detecting and displaying the input signal level (i.e., the signal level detection circuit 9a or 9b and the display unit 7b or 7c) is provided separately from the circuit portion for computing and displaying reverberation characteristics (i.e., the squaring and integrating circuit 5, the reverberation characteristics computing circuit 6 and the display unit 7a). This necessitates a complicated circuit design with a resulting large scale circuit.

SUMMARY OF THE INVENTION

It is, therefore, an object of the invention to provide a reverberation characteristics measuring device having a compact reverberation characteristics computing circuit and requiring less computation time without sacrificing the accuracy of measurement.

It is another object of the invention to provide a reverberation characteristics measuring device having a signal level computing and display circuit of a concise construction.

According to the invention, only a part of digital data of a large word length obtained by squaring and integrating is selected for computation of reverberation characteristics in accordance with a measurement environment such as the integration time and the duration of the test pulse. If the measuring environment is such that final squared and integrated data is relatively small, the most significant bit and some other bits consecutive to the most significant bit among the entire bits e.g. 40 bits of the output data of the squaring and integrating circuit are unnecessary for the computation of reverberation characteristics and, accordingly, data of a certain fixed number of bits excluding such unnecessary bits is selected for computation in the reverberation characteristics computing circuit. If the measuring environment is such that final squared and integrated data is relatively large, the least significant bit and some other bits consecutive to the least significant bit among the entire bits of the output of the squaring and integrating circuit are negligible and, accordingly, data of bits excluding such negligible bits is selected for computation. Based on the principle that the final squared and integrated data changes in accordance with the measuring environment such as the integration time and the duration of the test pulse, the device according to the present invention effects the above described selection automatically in association with setting of the measurement environment.

As regards displaying of the level of the input signal to the measuring device, the invention utilizes the principle that there is interrelation between the level of the input signal and the squared and integrated data of the input signal in case a bandwidth limitation is imposed on the input signal of the reverberation characteristics measuring device, and that the level of the input signal is to be computed on the basis of the squared and integrated data. According to the invention, intermediate squared and integrated data is computed at a certain time interval and thereafter is added with compensation data corresponding to the frequency band width of the input signal whereby the level of the input signal can be estimated. The compensation data is automatically determined in accordance with the set frequency of the test pulse so that the operation of the device is simplified.

These and other features of the invention will become more apparent from the description made hereinbelow in conjunction with the accompanying drawings.

BRIEF DESCRIPTION OF THE DRAWINGS

In the accompanying drawings.

DESCRIPTION OF PREFERRED EMBODIMENTS

Figure 1:
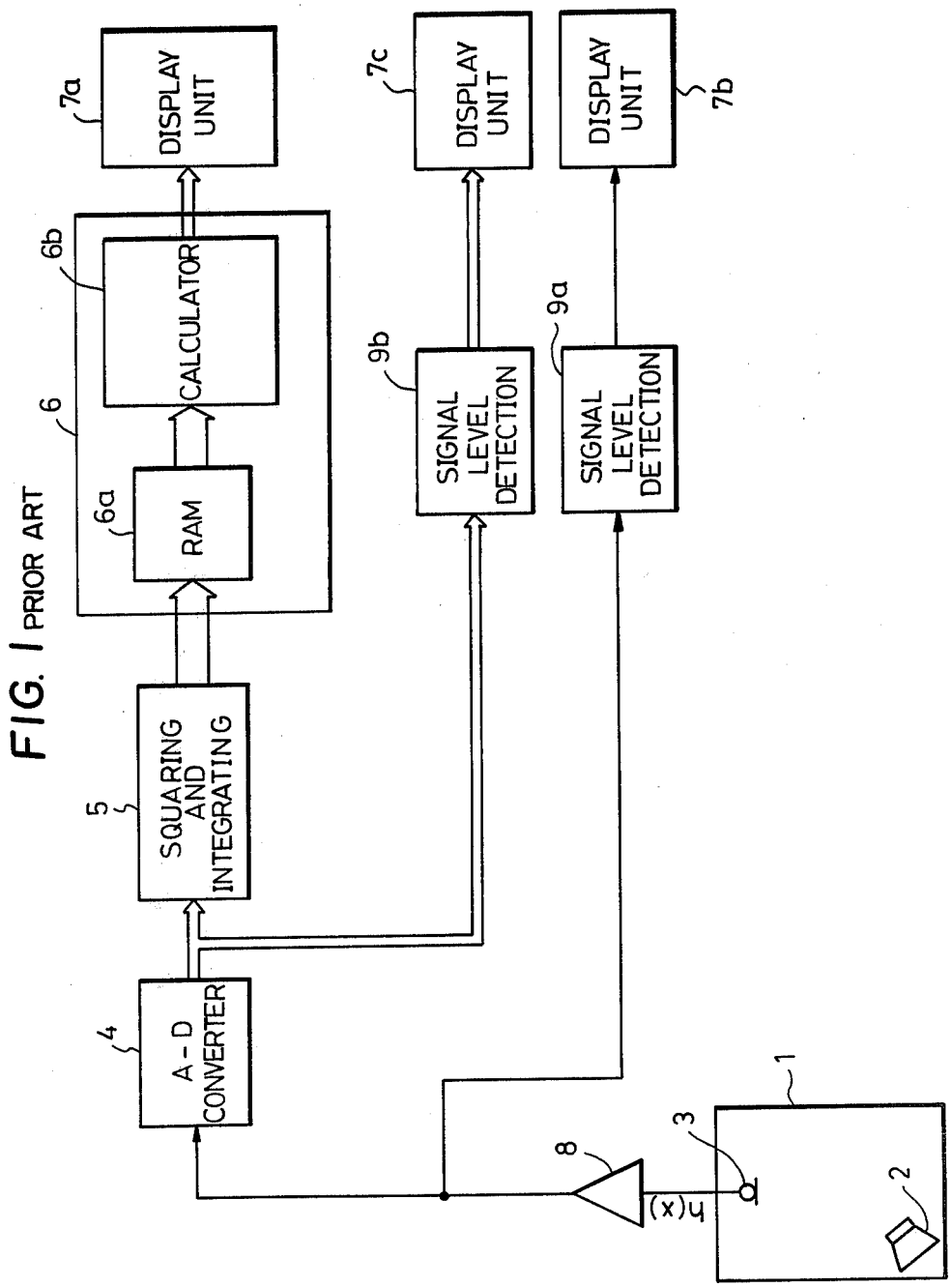
FIG. 1 is a block diagram schematically showing a prior art reverberation characteristics measuring device implementing a digital squaring and integrating computation process.
Figure 2:
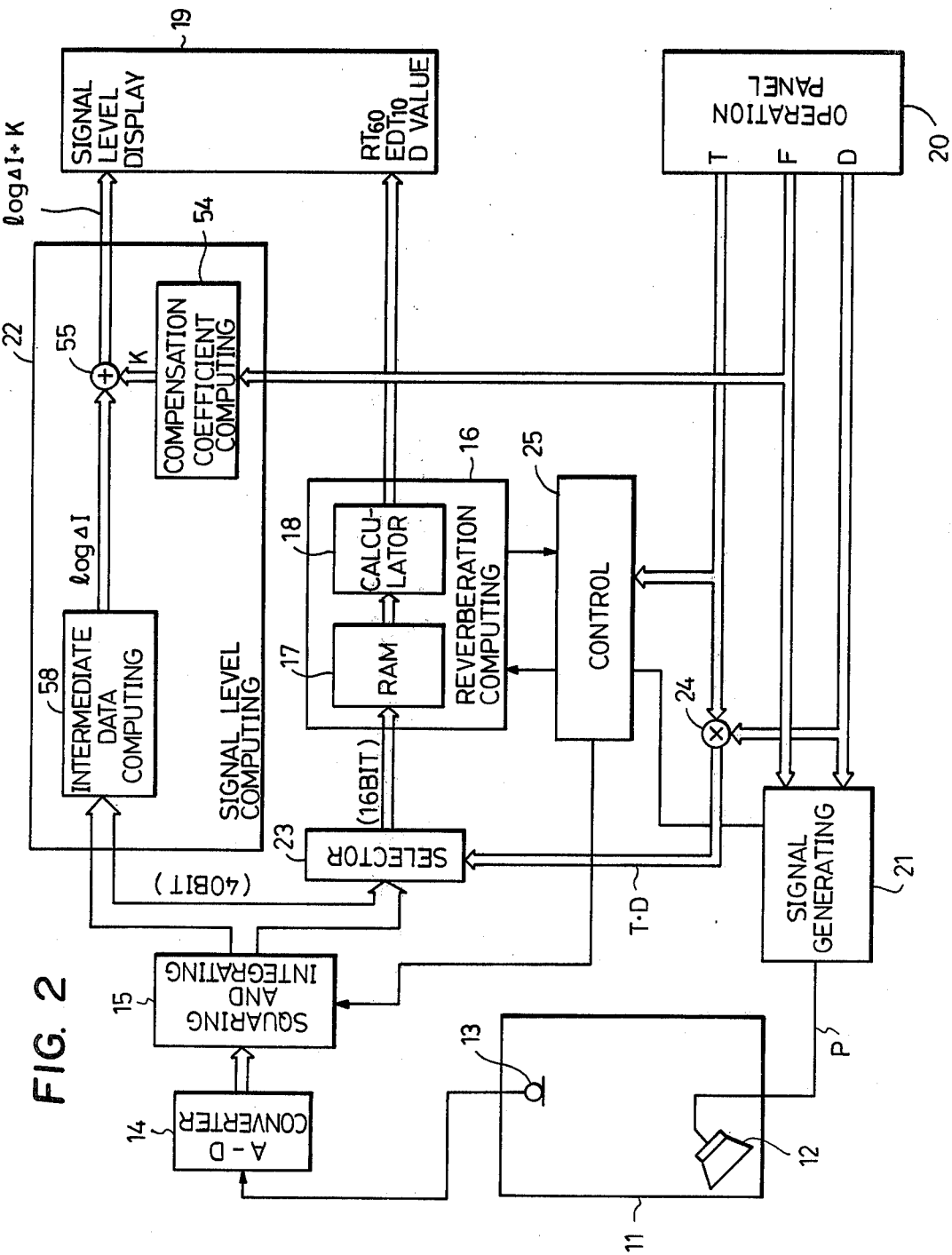
FIG. 2 is a block diagram schematically showing an embodiment of the reverberation characteristics measuring device according to the present invention.

Referring to FIG. 2 which schematically shows a preferred embodiment of the invention, an operation panel 20 includes means for setting variables which determine the measurement environment, i.e., integration time T for a squaring and integrating circuit 15, duration D of a test pulse P (tone burst wave) and frequency F of the test pulse P. A signal generating circuit 21 generates the test pulse P with the duration and frequency set by operation of the setting means in the operation panel 20.

The test pulse P is applied to a speaker 12 disposed in a measurement room 11 which is subject to the measurement and is sounded from the speaker 12. This sound from the speaker 12 is collected by a microphone 13. The output of the microphone 13 is converted to digital data by an analog-to-digital converter 14 and thereafter is squared and integrated in the squaring and integrating circuit 15. The output data of the squaring and integrating circuit 15 is applied to a signal level computing circuit 22 and also to a selector 23.

The signal level computing circuit 22 is provided for computing the level of the input signal. In the present embodiment, the level of the input signal is computed on the basis of the output of the squaring and integrating circuit 15. The level of the input signal which has a certain bandwidth limitation imposed thereon is represented by a sum of an intermediate squared and integrated data $\Delta I$ obtained in a predetermined time interval $\Delta T$ and a compensation coefficient K corresponding to the frequency of the input signal. In the signal level computing circuit 22, an intermediate square and integrated data computing circuit 58 calculates a logarithmic value $\log \Delta I$ of the intermediate data on the basis of the output of the squaring and integrating circuit 15. A compensation coefficient computing circuit 54 calculates the compensation coefficient K on the basis of the set frequency F of the test pulse P. An adder 55 adds the logarithmic data $\log \Delta I$ and the compensation coefficient K together to produce a sum $\log \Delta I + K$. This signal $\log \Delta I + K$ representing the level of the input signal is displayed in the display unit 19.

The selector 23 is provided for selecting a part of entire bits of the output of the squaring and integrating circuit 15 for measurement of reverberation. If final integrated data is large, the selector 23 selects a part of bits which are nearer to the most significant bit of the entire output data, whereas if the final integrated data is small, the selector 23 selects a part of bits which are nearer to the least significant bit of the entire output data. In the present embodiment, the word length of the output data of the squaring and integrating circuit 15 is set to be 40 bits among which the selector 23 selects 16 bits. Since the final integrated data changes depending upon the measurement environment, an arrangement is made so that location of the 16-bit data selected by the selector 23 is automatically changed in accordance with a set measurement environment. More specifically, since the final integrated data increases substantially in proportion to two variables, i.e., the integration time T of the squaring and integrating circuit 15 and the duration D of the test pulse P as will be described more in detail later with reference to FIG. 5, the 16-bit data is selected in accordance with the product of the integration time T data and the test pulse duration D data set in the operation panel 20. A multiplier 24 is provided for multiplying the value of the integration time T by the value of the pulse duration D. The selector 23 is controlled by the product T.D to select a part of bits necessary for the measurement.

The output of the selector 23 is applied to a reverberation characteristics computing circuit 16. In the circuit 16, the output data of the selector 23 is sampled and sequentially loaded in a RAM (random-access memory) 17. A calculator 18 calculates reverberation characteristics such as reverberation decay curve and reverberation time on the basis of the data loaded in the RAM 17.

The display unit 19 displays results of computation carried out in both the signal level computing circuit 22 and the reverberation characteristics computing circuit 16. In the present embodiment, measurement and display are made with respect to the following items:

(a) Reverberation time ($RT_{60}$)

This is the time interval until decaying of sound energy by 60 dB after stopping of the source. This reverberation time expresses the degree of reverberation in the measurement room.

(b) Early decay time ($EDT_{10}$)

This is the time interval until decaying of sound energy by 10 dB after stopping of the source. A liveness or a reverberation effect is reported to relate more deeply to this early decay time EDT than to the reverberation time RT which expresses the degree of reverberation in the entire measurmement room.

(c) D value

This value expresses $$\frac{\text{energy of initial reverberation of 0-50msec}}{\text{entire energy of reverberation}} \times 100$$

This D value expresses the degree of reverberation in a hearing position in the measurement room, that is, the clarity of tone color.

(d) reverberation decay curve

State of decay of the reverberating sound is displayed on a display panel device such as a cathode-ray tube.

A control circuit 25 is provided for supplying control signals to the reverberation characteristics computing circuit 16, the squaring and integrating circuit 15 and the signal generating circuit 21.

Figure 3:
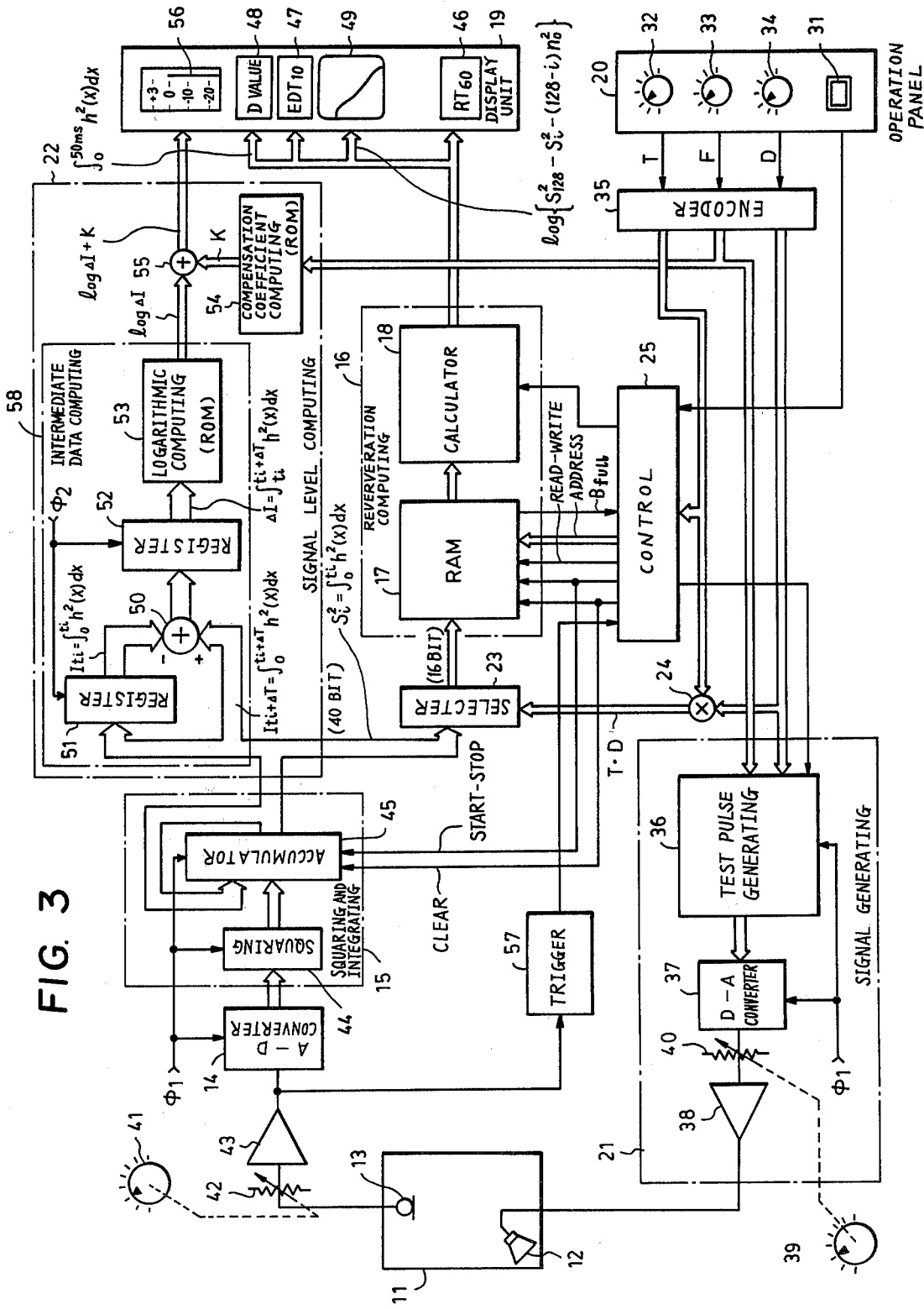
FIG. 3 is a block diagram showing circuit construction of the embodiments shown in FIG. 2 in detail.

An example of circuit construction of the above described embodiments is shown in FIG. 3.

In FIG. 3, the operation panel 20 comprises a start switch 31 for starting measurement and buttons for setting the measurement environment. These buttons include a button 32 for setting the integration time T, a button 33 for setting the frequency of the test pulse P and a button 34 for setting the duration D of the test pulse P. The respective set values T, F and D delivered out of the operation panel 20 are encoded into digital data by an encoder 35 and thereafter the F data and the D data are supplied to the signal generating circuit 21. The start signal from the start switch 31 is supplied to the control circuit 25 for driving the signal generating circuit 21 and other circuits. The set integration time T data is also supplied to the control circuit 25 for determining a sampling period.

Figure 4:
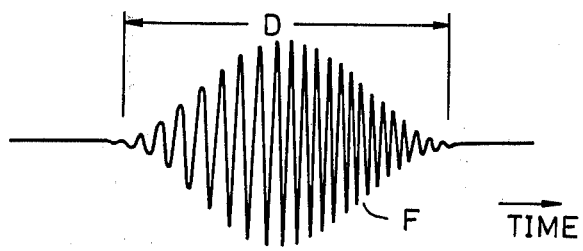
FIG. 4 is a diagram showing a tone burst waveform generated by a signal generating circuit shown in FIG. 3.

In the signal generating circuit 21, a test pulse generating circuit 36 generates digital signals corresponding to the test pulse P having the frequency F and duration D set in the operation panel 20. A digital-to-analog converter 37 converts these digital signals into analog signals, thereby forming test pulse P having the frequency F and the duration D as shown in FIG. 4. A clock pulse $\phi_1$ is applied to the test pulse generating circuit 36 and the digital-to-analog converter 37 to drive these circuits.

The output of the digital-to-analog converter 37 is adjusted in amplitude by an attenuator 40 which is connected to an output gain adjusting button 39 and thereafter is amplified by an amplifier 38. The amplified test pulse P reaches the speaker 12 provided in the measurement room 11 and is sounded by the speaker 12.

The sounded tone is collected by the microphone 13. The output of the microphone 13 is adjusted in amplitude by an attenuator 42 which is connected to an input gain adjusting button 41 and thereafter is amplified by an amplifier 43. The output of the amplifier 43 is converted into a digital signal by the analog-to-digital converter 14 and applied to the squaring and integrating circuit 15.

The squaring and integrating circuit 15 is composed of a squaring circuit 44 and an accumulator 45 which cumulatively adds output of the squaring circuit 44 together. The squaring and integrating circuit 15 and the analog-to-digital converter 14 are driven by the clock pulse $\phi_1$. In the present embodiment the word length of the output of the squaring and integrating circuit 15 is set at 40 bits.

The output data of the squaring and integrating circuit 15 is applied to the selector 23 in which 16-bit data is selected from the 40-bit output data in accordance with a final integrated data i.e., 16 consecutive bits including the most significant bit from among the data representing the final integrated data. If, accordingly, the output data of the squaring and integrating circuit 15 consists of 16 bits or less, all of the output data is selected by the selector 23, whereas if the output data consists of more than 16 bits, bits which are less significant than the sixteenth bit are omitted. Despite such omission, an error caused by the omission is negligible because the final integrated data is sufficiently large. The number of bits selected by the selector 23 is determined depending upon tolerance of error which will take place in the selection. Thus, the construction of the later stage can be simplified resulting from the above-mentioned selection of data-bit.

Figure 5:
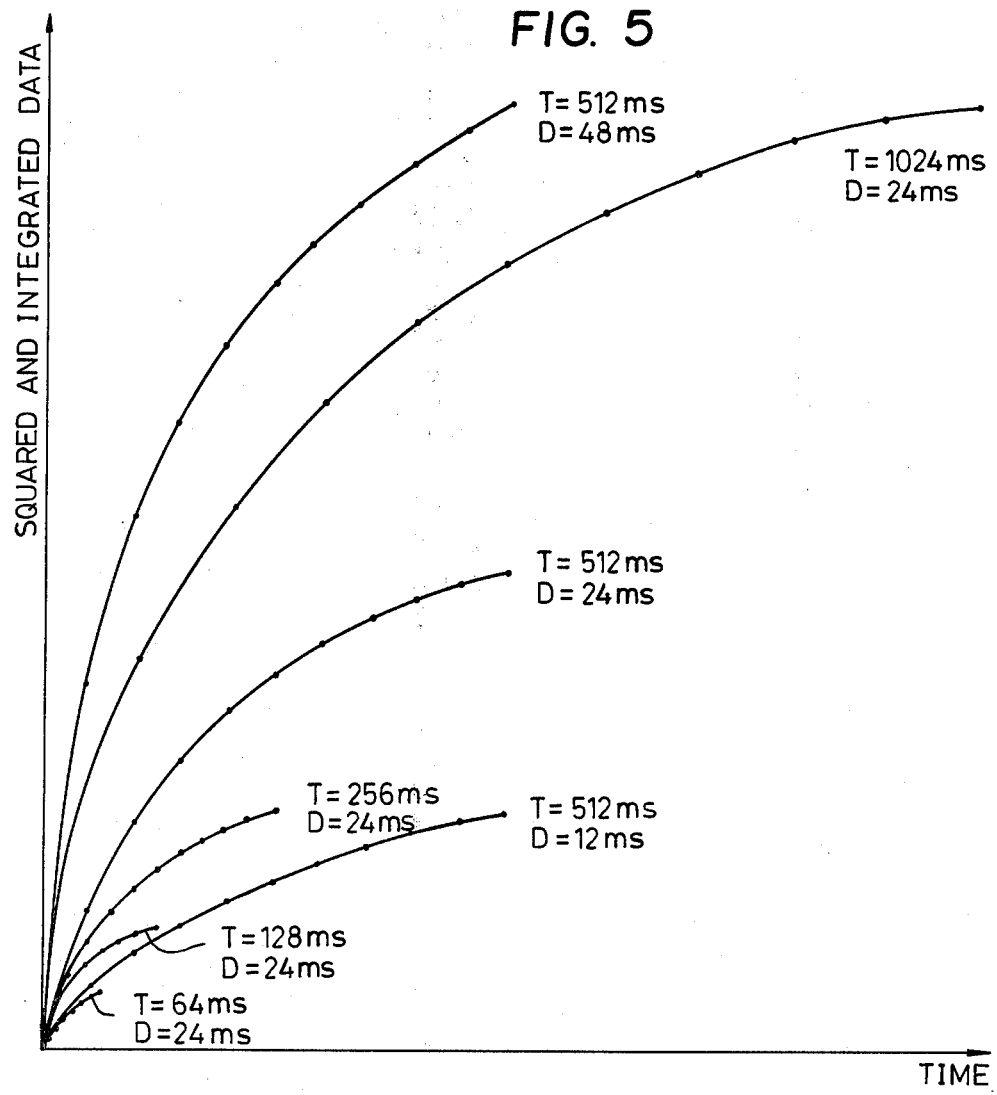
FIG. 5 is a graphical diagram showing variations of squared and integrated data relative to the measurement environment.
Figure 6:
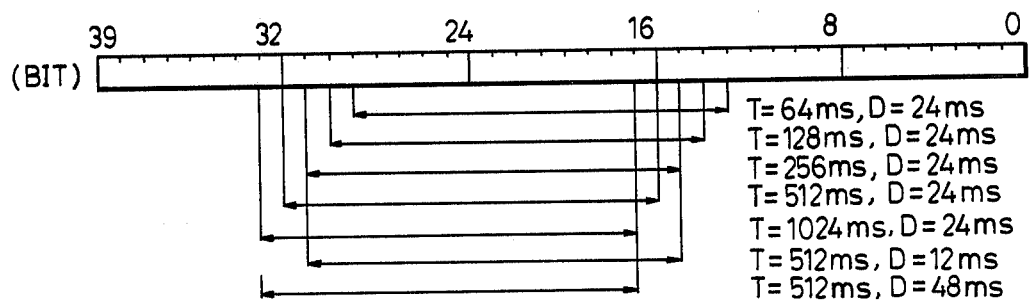
FIG. 6 is a diagram showing an example of locations of 16-bit data selected out of 40-bit squared and integrated data.

As described previously, the final integrated data increases substantially in proportion to the integration time T and the duration D of test pulse P. This is because the integration time T depends upon duration of reverberation and the duration D corresponds to energy of the test pulse P. FIG. 5 shows such proportionate relation between the final integrated data, and the integration time T and the test pulse duration D. In FIG. 5, the squared and integrated data-to-time characteristics is plotted with respect to cases where the level of the input signal is made constant and the integration time T and the test pulse duration D are varied. Utilizing such proportionate relation, the device according to the present invention automatically selects 16-bit data out of 40-bit data in accordance with the integration time T and the duration D. FIG. 6 shows an example of selection made by the selector 23. In FIG. 6, the scale represents bit numbers (40 bits of 0–39) of the squared and integrated data and ranges designated by arrows represent locations of 16-bit data selected in accordance with the integration time T and the test pulse duration D. In FIG. 3, the multiplier 24 supplies a product T.D of the integration time T data and duration D data to a control input of the selector 23 for enabling the selector 23 to make the above described selection.

The 16-bit data outputted from the selector 23 is sampled and sequentially loaded in the RAM 17. The RAM 17 includes (a) a portion which stores the sampled data, (b) a portion which stores squared and intergrated data at 50 msec after starting of reverberation for obtaining the D value above described and (c) a portion which stores squared and integrated data of a noise component in the measurement room.

The above described portion (a) of the RAM 17 has one hundred and twenty-eight (128) storage positions so that it can store the same number of sampled data as of these storage positions. The sampling period $\tau$ in this case therefore is T/128. The control circuit 25 applies a load signal and an address signal to the RAM 17 with this sampling period $\tau$ determined by the integration time T data set by the button 32 thereby causing the RAM 17 to store the sampled data.

The portion (b) of the RAM 17 stores the squared and integrated data at 50 msec after starting of reverberation in response to an instruction issued by the control circuit 25.

The portion (c) stores data $n_0^2$ obtained by squaring and integrating the noise component in the measurement room 11 before generation of the test pulse P in response to an instruction issued by the control circuit 25.

The calculator 18 calculates a reverberation characteristic (decay state of reverberation) on the basis of data read out from the RAM 17 in response to a read signal from the control circuit 25. The reverberation characteristic is obtained by consecutive values of log $\{S_{128}^2 - S_i^2 \cdot (128-i)n_0^2\}$ where $S_{128}^2$ represents a final squared and integrated data, $S_i^2$ (i=1 to 128) each sampled squared and integrated data and $n_0^2$ squared and integrated data of the noise component. The calculator 18 calculates the reverberation time $RT_{60}$ and the early decay time $EDT_{10}$ on the basis of the reverberation characteristic obtained in the above described manner. The calculator 18 also calculates the D value from the ratio of the squared and integrated data at 50 msec after starting of reverberation stored in the RAM 17 to the final squared and integrated data.

The reverberation time $RT_{69}$, the early decay time $EDT_{10}$ and the D value obtained by the calculator 18 are supplied to the display unit 19 and respectively displayed in an RT display section 46, an $EDT_{10}$ display section 47 and a D value display section 48. Further, the reverberation decay curve is displayed on the display tube 49 as a curve obtained by plotting values at respective sample points constituting the reverberation characteristic on a graph in which a horizontal axis represents time and a vertical axis intensity of reverberation.

The signal level computing circuit 22 functions to calculate the level of the input signal to the squaring and integrating circuit 15 on the basis of the squared and integrated data provided by the squaring and integrating circuit 15. The circuit 22 estimates an amplitude A of the input signal h(x) to the squaring and integrating circuit 15 from squared and integrated data $$\Delta I = \int_{t_i}^{t_i+\Delta T} h^2(x)dx$$

at a certain time interval $\Delta T$. The estimation of the amplitude A is made in the following manner.

Figure 7A:
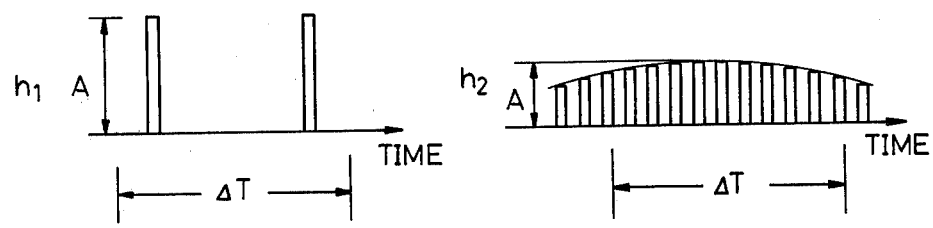
FIGS. 7(a) and 7(b) are diagrams for explaining a method for estimating the amplitude of an input level from the output of the squaring and integrating circuit 15.

If no condition is given to the input signal h(x), it is impossible to estimate the amplitude A from the squared and integrated data $\Delta I$. In other words, even if the pulse width is the same, the amplitude A is not always the same. A signal $h_1(x)$ shown in FIG. 7(a) which is of a coarse pulse interval has a greater amplitude A than a signal $h_2(x)$ shown in FIG. 7(b) which is of a close pulse interval notwithstanding that the signal $h_2(x)$ has a greater squared and integrated data than the signal $h_1(x)$. It will be seen from this that there is no interrelation whatsoever between the amplitude A of the input signal h(x) and the squared and integrated data $\Delta I$.

Figure 7B:
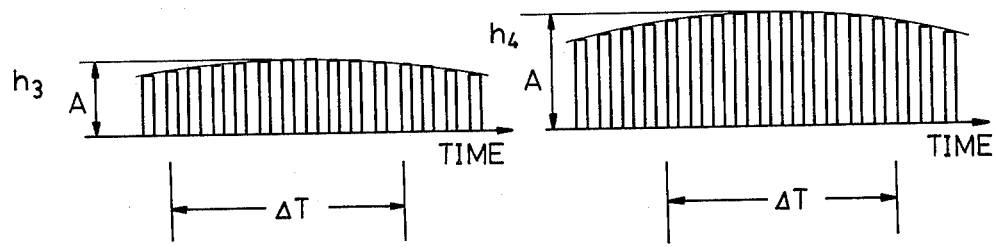

If a bandwidth limitation is imposed on the input signal h(x), i.e., if a certain frequency is given to the input signal h(x), there exists an interrelation between the amplitude A of the input signal h(x) and the data $\Delta I$. If, for example, signal $h_3(x)$ and $h_4(x)$ have the same frequency as shown in FIG. 7(b), the signal $h_4(x)$ which is of a greater amplitude A has a greater squared and integrated data $\Delta I$ than the signal $h_3(x)$. In such a case, the amplitude A is estimated in the following manner.

Assuming, for the sake of simplicity, that the input signal h(x) is expressed by the equation $$h(x) = A \sin \omega x, \quad (1)$$

the value $\Delta I$ becomes $$\Delta I = \int_{t_i}^{t_i+\Delta T} h^2(x)dx \quad (2)$$

$$= \int_{t_i}^{t_i+\Delta T} A^2 \sin^2 \omega x \, dx$$

If phase of the signal h(x) at $t=t_i$ is designated by $\phi$, the value $\Delta I$ is expressed as follows:

$$\Delta I = \int_0^{\Delta T} A^2 \sin^2(\omega x + \phi) \, dx \quad (3)$$

$$= \int_0^{\Delta T} \frac{A^2}{2} \{1 - \cos(2\omega x + 2\phi)\} dx$$

$$= \frac{A^2}{2} \left[ x - \frac{\sin(2\omega x + 2\phi)}{2\omega} \right]_0^{\Delta T}$$

$$= \frac{A^2}{2} \left\{ \Delta T - \frac{\sin(2\omega \Delta T + 2\phi) - \sin 2\phi}{2\omega} \right\}$$

$$= \frac{A^2}{2} \left\{ \Delta T - \frac{\cos(\omega \Delta T = 2\phi)\sin \omega \Delta T}{\omega} \right\}.$$

By setting $$C_1 = \frac{1}{2} \Delta T \left\{ 1 - \frac{\sin \omega \Delta T}{\omega \Delta T} \cdot \cos(\omega \Delta T + 2\phi) \right\}, \quad (4)$$

the value $\Delta I$ becomes $$\Delta I = A^2 \cdot C_1,$$

and the amplitude A is represented by $$A = \left( \Delta I \cdot \frac{1}{C_1} \right)^{\frac{1}{2}}.$$

Logarithmic level L of the amplitude A can be obtained by the following equation (5).

$$L = 20 \log A = 10(\log \Delta I = \log C_1) \quad (5)$$

In the equation (5), a compensation coefficient $C_1$ is functions of the integration time interval $\Delta T$, the frequency $\omega$ of the signal h(x) and the initial phase $\phi$ as shown in the equation (4). Since there is a relation $-1 \leq \cos(\omega \Delta T = 2\phi) \leq 1$, a maximum value $C_1 max$ and a minimum value $C_1 min$ of the compensation coefficient $C_1$ can be expressed by the following equations, if the integration time $\Delta T$ and the frequency $\omega$ are given:

$$C_1 max = \frac{1}{2} \Delta T \left( 1 + \frac{\sin \omega \Delta T}{\omega \Delta T} \right) \quad (6)$$

$$C_1 min = \frac{1}{2} \Delta T \left( 1 - \frac{\sin \omega \Delta T}{\omega \Delta T} \right). \quad (7)$$

What is essential in the measurement of reverberation is that the amplitude A of the input signal h(x) is set not to exceed the input range of the analog-to-digital converter 14. Accordingly, in the signal level computing circuit 22, it is sufficient to estimate the amplitude A based on the maximum value Lmax of the value L in the equation (5). If $C_1$ in the equation (5) is substituted by the equation (7), the following equation (8) can be obtained:

$$Lmax = 10 \left\{ \log \Delta I - \log \frac{1}{2} \Delta T \left( 1 - \frac{\sin \omega \Delta T}{\omega \Delta T} \right) \right\} \quad (8)$$

$$= 10\left\{\log\Delta I - \log\tfrac{1}{2}\Delta T - \log\left(1 - \frac{\sin\omega\Delta T}{\omega\Delta T}\right)\right\}$$

$$10\{\log\Delta I + K\} \tag{9}$$

where $-K = \log\dfrac{\Delta T}{2} + \log\left(1 - \dfrac{\sin\omega\Delta T}{\omega\Delta T}\right)$.

If, accordingly, the integration time interval $\Delta T$ and the frequency $\omega$ of the input signal $h(x)$ are given, the level Lmax of the input signal $h(x)$ can be estimated from the value K which is calculated by the equation (9) and the intermediate squared and integrated data $\Delta T$.

In the above described estimation, the input signal $h(X)$ is assumed to be a sine wave. A practically sufficient approximation can also be obtained with respect to a band width limitation in the order of one third octave bandwidth by employing the compensation coefficient K relative to the center frequency of the band. Accordingly, the compensation coefficient $C_1$ corresponding to the frequency F of the test pulse P may be employed in the present embodiment.

The intermediate squared and integrated data computing circuit 58 in the signal level computing circuit 22 includes a subtractor 50, registers 51 and 52 and a logarithmic computing circuit 53. The subtractor 50 is provided for obtaining the intermediate squared and integrated data $\Delta I$ in the time interval $\Delta T$. The squared and integrated data $I_{ti}$ from the squaring and integrating circuit 15 is applied to a minuend input of the subtractor 50 and the register 51. The register 51 is driven by a clock pulse $\phi_2$ whose pulse interval is $\Delta T$ so that the storage of the value $I_{ti}$ is rewritten every interval $\Delta T$. The output of the register 51 is applied to a subtrahend input of the subtractor 50. The subtractor 50 therefore subtracts the outputs of the register 51 from the output of the squaring and integrating circuit 15. The register 52 is driven by the clock pulse $\phi_2$ to maintain the result of subtraction during each time interval $\Delta T$. The register 52 therefore maintains difference between the present squared and integrated data $I_{ti}+\Delta T$ and the data $I_{ti}$ existing at time preceding by the time interval $\Delta T$, i.e., the intermediate data $\Delta I$.

The output $\Delta I$ of the register 52 is applied to the logarithmic computing circuit 53 which produces an output log $\Delta I$.

The compensation coefficient computing circuit 54 calculates the compensation coefficient K from the set frequency data F of the test pulse P outputted by the encoder 35 and the time $\Delta T$ which is equivalent to the period of the clock pulse $\phi_2$ and is a predetermined value. An adder 55 adds the output log $\Delta I$ of the logarithmic computing circuit 53 and the output K of the compensation coefficient computing circuit 54 together to produce a log $\Delta I+K$. This sum log $\Delta I+K$ is supplied to a level display section 56 where the maximum value Lmax of the input signal (equation (8)) is displayed.

A trigger circuit 57 serves to detect the rise of output signal of the microphone 13 to start the squaring and integrating operation.

Figure 8:
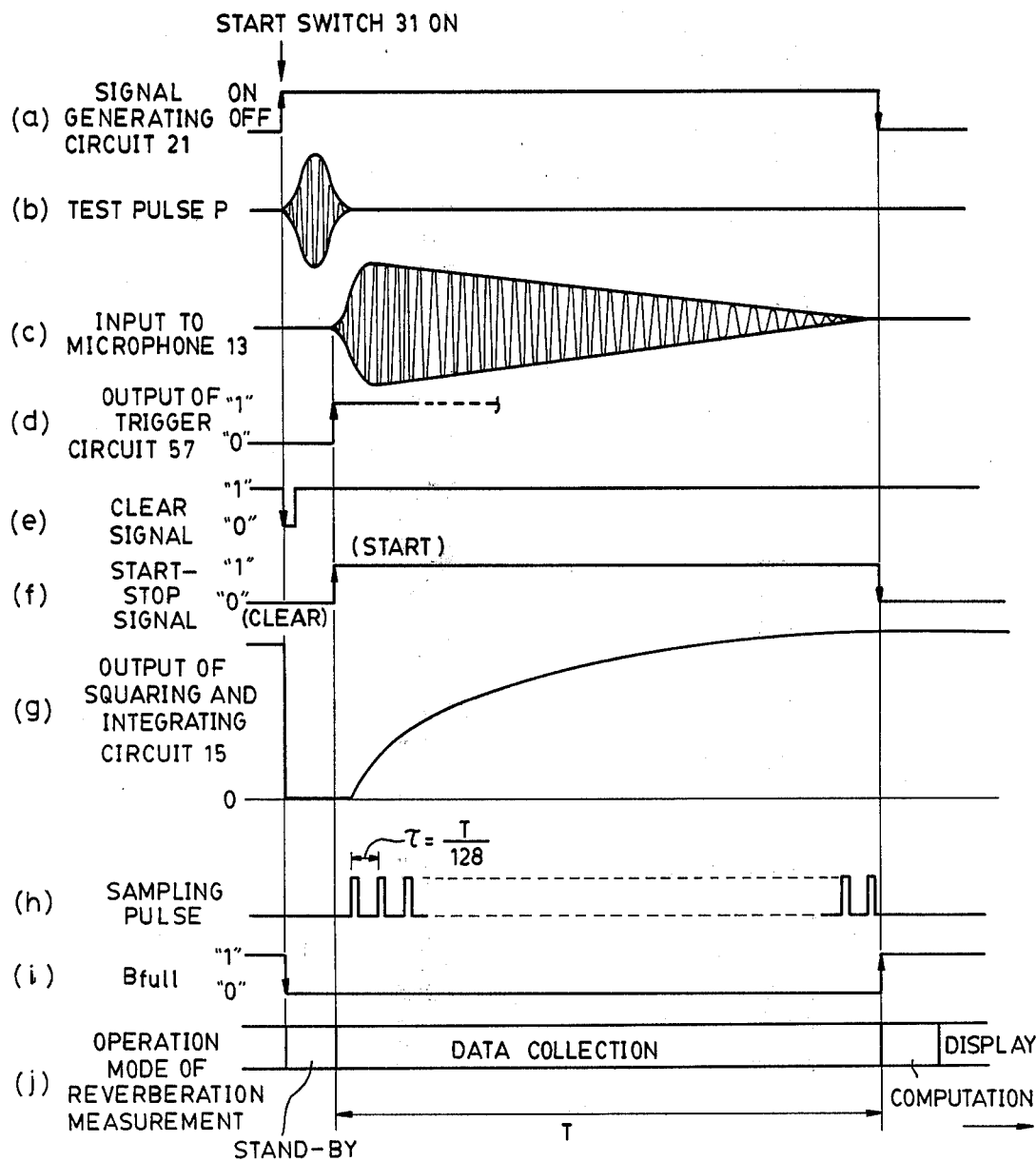
FIG. 8 is a time chart for explaining the operation of the circuit shown in FIG. 3.

The operation of the above described embodiment during measurement of reverberation will now be described with reference to FIG. 8.

For measuring reverberation, the integration time T, the frequency F and duration D of the test pulse P are set at desired values by operating the buttons 32, 33 and 34 of the operation panel 20. Noise component in the measurement room 11 is previously measured and the squared and integrated data $n_0^2$ of the noise component is loaded in a predetermined storage position of the RAM 17.

Upon turning on of the start switch 31 on the operation panel 20, the signal generating circuit 21 is driven by a signal from the control circuit 25 (FIG. 8(a)) whereby the test pulse P as shown in FIG. 8(b) is sounded by the speaker 12. Simultaneously, a signal shown in FIG. 8(e) is outputted by the control circuit 25 at the trailing edge of which the squaring and integrating circuit 15 and the sampled and stored data of the RAM 17 are cleared.

Upon sounding of the test pulse P, reverbration $r(x)$ as shown in FIG. 8(c) is produced in the measurement room 11 and the reverberating sound is collected by the microphone 13. At the rise of the output of the microphone 13, the trigger circuit 57 produces a signal as shown in FIG. 8(d). The control circuit 25 detects the rise of the output signal of the trigger circuit 57 and thereupon supplies a start-stop signal as shown in FIG. 8(f) to the squaring and integrating circuit 15 thereby starting the squaring and integrating operation. The integration time T starts from this time point.

The 40-bit squared and integrated data (an increasing state of the data is shown in FIG. 8(f)) is applied to the selector 23 and the 16-bit data corresponding to the integration time T and the test pulse duration D is outputted by the selector 23. The output of the selector 23 is sampled by a sampling pulse shown in FIG. 8(h). The period $\tau$ of this sampling pulse is T/128. Accordingly, the number of sample points is 128 regardless of the integration time T. If the integration time T is short, the sampling period is short whereas if the integration time T is long, the sampling period also is long. In FIG. 5, ten(10) sample points are used for convenience of explanation and the dots on the respective curves in the graph represent respective sampling positions. The following Table 1 shows the sampling period $\tau$ relative to the integration time T in a case where one hundred and twenty-eight (128) sample points are used and locations of the selected 16-bit data in a case where the test pulse duration D is 24 msec.

TABLE 1

| Integration time T [sec] | Sampling period $\tau = \dfrac{T}{128}$ [msec] | Locations of 16-bit data selected out of 40-bit squared and integrated data (0–39) (D = 24 msec) [MSB - LSB] |
|---|---|---|
| 0.064 | 0.5 | 28–13 |
| 1.128 | 1.0 | 29–14 |
| 0.256 | 2.0 | 30–15 |
| 0.512 | 4.0 | 31–16 |
| 1.024 | 8.0 | 32–17 |
| 2.048 | 16.0 | 33–18 |
| 4.096 | 32.6 | 34–19 |
| 8.192 | 64.0 | 35–20 |
| 16.4 | 128.0 | 36–21 |
| 32.8 | 256.0 | 37–22 |
| 62.5 | 512.0 | 38–23 |

The sampled 16-bit data is sequentially loaded in corresponding addresses of the RAM 17 of the reverberation computing circuit 16.

In the meanwhile, the signal level computing circuit 22 computes the logarithmic value log $\Delta I$ of the intermediate squared and integrated data and the compensation coefficient K on the basis of the frequency F data of the set test pulse P and supplies the sum log $\Delta I+K$ to the level display section 56. The level displayed in the section 56 is one which has been estimated as the maximum value Lmax of the input level. In measurement of reverberation, this display level is utilized for watching the input level of the analog-to-digital converter 14. If the input level of the analog-to-digital converter 14 has exceeded the input range thereof, an accurate measurement cannot be expected so that the measurement is conducted again from the start.

As the measurement progresses smoothly and the sampling of the data at all of the 128 sample points has been completed, the RAM 17 produces a signal $B_{full}$ shown in FIG. 8(i) representing that the data has been loaded in all of the addresses of the RAM 17. In response to this signal $B_{full}$, the start-stop signal (FIG. 8(f)) falls and the squaring and integrating operation is stopped. The reverberation computing circuit 16 computes the reverberation characteristics, i.e., the reverberation time $RT_{60}$, the early decay time $EDT_{10}$ and the D value, on the basis of the contents stored in the RAM 17. The computed data and the reverberation decay curve are respectively displayed in the display unit 19.

FIG. 8(j) shows operation modes of the measurement of reverberation. The operation mode changes from "stand-by mode" which is a state from turning on of the start switch 31 till generation of the trigger signal (FIG. 8(d)) to "data collection mode" which is a state from generation of the trigger signal until generation of the signal $B_{full}$ and further to "reverberation computation mode" and "display mode."

What is claimed is:

1. A reverberation characteristics measuring device comprising:

a signal generating circuit for generating a signal for a test sound;

first setting means for setting a duration of said test sound;

means for converting a reverberation signal produced by sounding of said test sound to a digital signal;

a squaring and integrating circuit for squaring and integrating said digital reverberation signal;

second setting means for setting an integration time of said squaring and integrating circuit;

a selector for selecting out a partial section of the entire output data of said squaring and integrating circuit;

selector control means coupled to said first and second setting means for determining said partial section of the entire output data to be selected by said selector;

a reverberation characteristics computing circuit for computing reverberation characteristics on the basis of the output of said selector; and a display unit for displaying the reverberation characteristics computed by said computing circuit.

2. A reverberation characteristics measuring device as defined in claim 1 wherein said selector control means comprises a circuit for producing data representing the product of data representing the duration of the signal for the test sound and data representing the integration time of said squaring and integrating circuit and for supplying the product data to said selector.

3. A reverberation characteristics measuring device comprising:

a signal generating circuit for generating a signal for a test sound;

frequency setting means for setting a frequency of said test sound;

means for converting a reverberation signal produced by sounding of said test sound to a digital signal;

a squaring and integrating circuit for squaring and integrating said digital reverberation signal;

a reverberation characteristics computing circuit for computing reverberation characteristics on the basis of the output of said squaring and integrating circuit;

an intermediate data computing circuit for computing intermediate data of the output of said squaring and integrating circuit outputted during a predetermined time interval;

a compensation circuit for compensating the intermediate data in accordance with the frequency set by said frequency setting means; and a display unit for displaying the compensated intermediate data as data representing the level of the reverberation signal.

4. A reverberation characteristics measuring device as defined in claim 3 wherein said intermediate data computing circuit comprises a first register receiving the output of said squaring and integrating circuit and having data stored therein rewritten every predetermined time interval, a subtractor subtracting the output of said first register from the output of said squaring and integrating circuit, a second register receiving a difference signal from said subtractor and maintaining the difference signal during the time interval, and a logarithmic computing circuit for converting the output of said second register to logarithmic data; and said compensation circuit comprises a compensation coefficient computing circuit calculating a compensation coefficient on the basis of the frequency set by said frequency setting means and the time interval, and an adder adding the output of said logarithmic computing circuit and the output of said compensation coefficient computing circuit together.

* * * * *